United States Patent Office 3,794,637
Patented Feb. 26, 1974

3,794,637
PYRIDO[2,3-d]PYRIMIDIN-4(3H)-ONES
Fritz Wiedemann and Max Thiel, Mannheim, Kurt Stach, Mannheim-Waldhof, Egon Roesch, Lampertheim, and Klaus Hardebeck, Ludwigshafen (Rhine), Germany, assignors to Boehringer Mannheim GmbH, Mannheim, Germany
No Drawing. Filed July 22, 1971, Ser. No. 165,391
Claims priority, application Germany, July 31, 1970, P 20 38 035.2
Int. Cl. C07d 51/46
U.S. Cl. 260—256.4 F                5 Claims

ABSTRACT OF THE DISCLOSURE

Pyrido-[2,3-d]pyrimidin-4(3H)-ones of the general formula

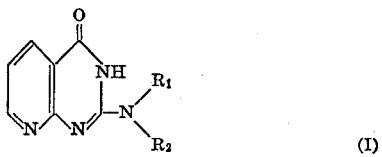

wherein $R_1$ is a lower alkyl, alkenyl, cycloalkyl, aralkyl, furylalkyl, thienylalkyl or tetrahydrofurylalkyl radical, optionally substituted by hydroxy, alkoxy or alkylmercapto radicals, and
$R_2$ is $R_1$ or hydrogen, and the salts thereof with physiologically compatible acids. These compounds exhibt longlasting diuretic action.

---

The present invention is concerned with new pyrido-pyrimidine derivatives and with the preparation thereof and is also concerned with pharmaceutical compositions containing these new pyrido-pyrimidine derivatives and their use.

The new pyrido-pyrimidine derivatives according to the present invention are compounds of the general formula:

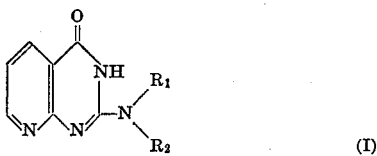

wherein $R_1$ is a lower alkyl, alkenyl, cycloalkyl, aralkyl, furylalkyl, thienylalkyl or tetrahydrofurylalkyl radical, optionally substituted by hydroxy, alkoxy or alkylmercapto radicals, and
$R_2$ is $R_1$ or hydrogen, and the salts thereof with physiologically compatible acids.

In British patent specification No. 774,095, there are disclosed unsubstituted and N-phenyl substituted 2-amino-4-hydroxypyrido[2,3-d]pyrimidines which are folic acid antagonists with an anti-microbial action.

We have now found that the new Compounds I according to the present invention are, surprisingly, characterized by an excellent diuretic and natriuretic action.

The new compounds according to the present invention can be prepared, for example, by one of the following methods:

(a) reaction of compounds of the general formula:

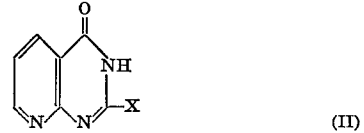

wherein X is a reactive group, with compounds of the general formula:

$$R_1\text{—NH—}R_2 \qquad (III)$$

wherein $R_1$ and $R_2$ have the same meanings as above; or (b) condensation of propargyl aldehyde or of a reactive derivative thereof with a compound of the general formula:

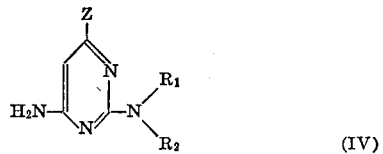

wherein $R_1$ and $R_2$ have the same meanings as above and Z is a hydroxyl, mercapto or amino group or an alkoxy, phenoxy or alkylmercapto radical, and, if necessary, the group Z converted simultaneously or subsequently into a hydroxyl group; or (c) reaction of 2-amino-4-hydroxypyrido[2,3-d]pyrimidine with a compound of the general formula $$R_1\text{—Y or } R_2\text{—Y} \qquad (V)$$

wherein $R_1$ and $R_2$ have the same meanings as above and Y is a reactive group; or (d) reaction of compounds of the general formula:

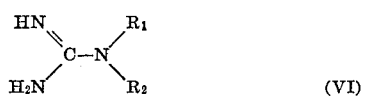

wherein $R_1$ and $R_2$ have the same meanings as above, or of the corresponding cyanamide derivatives, with 2-amino-pyridine-3-carboxylic acid or with a reactive derivative thereof; whereafter, if desired, the Compounds I thus obtained are subsequently converted, by reaction with acids, into the corresponding pharmacologically compatible salts.

As reactive compounds of General Formula II, it is preferred to use the halides or the alkyl or phenyl ethers or thioethers, especially the chloride or bromide.

For carrying out process (a), a compound of General Formula II is reacted in aqueous or alcoholic solution with an amine of General Formula III. However, the reaction can also be carried out without the use of a solvent in a large excess of the amine reaction component (III).

The reaction is normally carried out at an elevated temperature, preferably at a temperature between about 50 and 100° C., with a satisfactory reaction velocity. If low boiling solvents are used or readily volatile amines, then it is recommended to use a pressure apparatus in order to be able to increase the temperature sufficiently.

The reaction of propargyl aldehyde with compounds of General Formula IV best takes place at low temperatures, preferably at a temperature of about 0–30° C. in an alkaline aqueous, aqueous alcoholic or alcoholic solution. As reactive derivatives of propargyl aldehyde, there can be used, for example, β-anilino-acrolein or β-chloroacrolein.

The conversion of the group Z in compounds of General Formula IV takes place, after the reaction, in known manner, i.e. when Z is a mercapto group, by oxidation with, for example, an aqueous solution of hydrogen peroxide; when Z is an alkoxy or alkylmercapto radical, by hydrolysis; and when Z is an amino group, by diazotization and subsequent boiling of the diazonium salt.

As reactive derivatives of 2-aminopyridine-3-carboxylic acid, there can be used, for example, lower alkyl esters or the corresponding amide. The compounds of General Formula VI or the corresponding cyanamide derivatives can be condensed with the 2-aminopyridine-3-carboxylic acid derivatives in aqueous or alcoholic solution in the alkaline range.

As compounds of General Formula V with a reactive group Y, there can be used all compounds which, in the case of an N-alkylation, lead to the substituents $R_1$ and $R_2$. These are, in particular, the correspondingly substituted alkyl halides and alkyl sulfonates. In some cases, there can also be used diazoalkanes and, for example, formaldehyde, compounds of General Formula I then being obtained in which $R_1$ and/or $R_2$ represents an alkyl radical or a hydroxymethyl radical.

For conversion into salts, the compounds of General Formula I can be reacted, for example, in aqueous solution with the calculated amount of a physiologically compatible acid and then preferably evaporated to dryness in a vacuum.

For the use of the new compounds according to the present invention as pharmaceuticals with a diuretic and natriuretic action, there can, in principle, be used all forms which are suitable for enteral or parenteral administration. For this purpose, the active material is mixed with a solid or liquid pharmaceutical diluent or carrier and then brought into a suitable form for administration.

As examples of solid carrier materials, there may be mentioned lactose, mannitol, starch, talc, methyl cellulose, gelatine and the like, to which, if desired, there can be added coloring materials and/or flavoring agents. Because of the low solubility of the new compounds according to the present invention, very few solvents are suitable for the preparation of injectable solutions, for example, dimethyl sulfoxide. Higher concentrations are, therefore, preferably administered in the form of suspensions.

For human medicine, in the case of enteral administration, there can be given between about 10 and 500 mg. active material per day in the form of 1–4 individual doses; in the case of intravenous administration, the most favorable amount of active material is between about 5 and 100 mg. per day.

The new compounds according to the present invention, which are characterized by a good and surprisingly long-lasting diuretic action, bring about in the organism an increased excretion of sodium ions, without thereby influencing the excretion of potassium ions. In this way, the new compounds according to the present invention differ from the previously known diuretics which bring about either an increased excretion of sodium and potassium ions or an excretion of sodium ions with a simultaneous retention of potassium ions. Thus, the physician is provided with a new agent for the treatment of patients with a disturbed sodium metabolism but with a normal potassium metabolism.

The following examples are given for the purpose of illustrating the present invention:

EXAMPLE 1

2-methylamino-pyrido[2,3-d]pyrimidin-4(3H)-one (a) 5.44 g. of 2-chloropyrido[2,3-d]pyrimidin-4(3H)-one are mixed with 100 ml. of 35% aqueous methylamine solution and left to stand for 48 hours at ambient temperature. The reaction mixture is then evaporated to dryness in a vacuum, the evaporation residue is mixed with water, neutralized with 2 N hydrochloric acid and the residue is recrystallized from methanol, with the use of activated charcoal. There are thus obtained 2.9 g. (55% of theory) of 2-methylamino-pyrido[2,3-d]pyrimidin-4(3H)-one in the form of colorless crystals which melt, with decomposition, at 300–303° C. The corresponding hydrochloride has a melting point of >300° C.

(b) in an analogous manner, by the reaction of 2-chloropyrido[2,3-d]pyrimidin-4(3H)-one with a 33% aqueous solution of ethylamine, there is obtained, in a yield of 53% of theory, 2-ethylamino-pyrido[2,3-d]pyrimidin-4(3H)-one in the form of colorless crystals with a melting point of 290–293° C.

EXAMPLE 2

2-isopropylamino-pyrido[2,3-d]pyrimidin-4(3H)-one (a) 3.62 g. of 2-chloropyrido[2,3-d]pyrimidin-4(3H)-one are heated in an autoclave for 5 hours at 110° C. with 50 ml. of isopropylamine. The reaction mixture is then evaporated to dryness in a vacuum, the residue is treated with water and then recrystallized from isopropanol with the use of activated charcoal. There are thus obtained 2.1 g. (51.5% of theory) of 2-isopropylamino-pyrido[2,3-d]pyrimidin-4(3H)-one in the form of colorless crystals with a melting point of 242–244° C.

(b) In an analogous manner, by the reaction of 2-chloropyrido[2,3-d]pyrimidin-4(3H)-one with n-propylamine, there is obtained, in a yield of 60% of theory, 2-n-propylamino-pyrido[2,3-d]pyrimidin-4(3H)-one which, after recrystallization from water, has a melting point of 250–252° C.

EXAMPLE 3

2-allylamino-pyrido[2,3-d]pyrimidin-4(3H)-one (a) 3.62 g. of 2-chloropyrido[2,3-d]pyrimidin-4(3H)-one are heated under reflux for 10 hours with 50 ml. of allylamine. The reaction mixture is then evaporated to dryness and the residue then recrystallized from methanol-water (1:1). There are thus obtained 3.1 g. (76.5% of theory) of 2-allylaminopyrido[2,3-d]pyrimidin-4(3H)-one in the form of yellowish crystals with a melting point of 240–242° C.

(b) In an analogous manner, by the reaction of 2-chloropyrido[2,3-d]pyrimidin-4(3H)-one with cyclopentylamine, there is obtained, in a yield of 72% of theory, 2-cyclopentylaminopyrido[2,3-d]pyrimidin - 4(3H) - one in the form of colorless crystals which, after recrystallization from methanol, have a melting point of 274–276° C.

EXAMPLE 4

2-(2-hydroxyethylamino)-pyrido[2,3-d]pyrimidin-4(3H)-one 3.62 g. of 2-chloropyrido[2,3-d]pyrimidin-4(3H)-one are heated under reflux for 5 hours in 50 ml. of water with 6.1 g. of ethanolamine. The reaction mixture is thereafter neutralized with dilute hydrochloric acid and the residue is recrystallized from water, with the addition of activated charcoal. There are obtained 2.2 g. (53.5% of theory) of 2 - (2 - hydroxyethylamino)pyrido[2,3 - d]pyrimidin-4(3H)-one in the form of colorless crystals which melt, with decomposition, at 256–258° C.

EXAMPLE 5

2-(2,2-dimethoxyethylamino)-pyrido[2,3-d]pyrimidin-4(3H)-one (a) 10.8 g. of 2-chloropyrido[2,3-d]pyrimidin-4(3H)-one, together with 12.6 g. of aminoacetaldehyde dimethyl acetal, 30 g. of triethylamine and 90 ml. of water, are heated under reflux for 48 hours. The reaction mixture is then neutralized with dilute hydrochloric acid and the residue is recrystallized from water, with the use of activated charcoal. There are thus obtained 8.5 g. (57% of theory) of 2-(2,2-dimethoxyethylamino)-pyrido[2,3-d]pyrimidin- 4(3H)-one in the form of colorless crystals which melt, with decomposition, at 220–222° C.

(b) In an analogous manner, by the reaction of 2-chloropyrido[2,3-d]pyrimidin-4(3H)-one with aminoacetaldehyde diethyl acetal, with a reaction period of 10 hours, there is obtained, in a yield of 60% of theory, 2 - (2,2 - diethoxyethylamino)-pyrido[2,3-d]pyrimidin-4(3H)-one in the form of yellowish crystals which, after recrystallization from methanol, have a melting point of 213–215° C.

EXAMPLE 6

2-(2-methoxyethylamino)-pyrido[2,3-d]pyrimidin-4(3H)-one

A mixture of 3.6 g. of 2-chloropyrido[2,3-d]pyrimidin-4(3H)-one, 4.5 g. of 2-methoxyethylamine and 35 ml. of ethanol is boiled under reflux for 5 hours. After filtering with suction, the solid material obtained is recrystallized from water with the use of activated charcoal. There are thus obtained 2.3 g. (52% of theory) of 2-(2-methoxyethylamino)-pyrido[2,3-d]pyrimidin-4(3H)-one in the form of colorless crystals which have a melting point of 241–243° C.

EXAMPLE 7

2-furfurylamino-pyrido[2,3-d]pyrimidin-4(3H)-one (a) 40.0 g. of 2-chloropyrido[2,3-d]pyrimidin-4(3H)-one are boiled under reflux for 5 hours with 64 g. of furfurylamine and 300 ml. of ethanol. The reaction mixture is then filtered with suction, the solid material obtained thereafter washed with ethanol and the product purified by dissolving in a dilute aqueous solution of sodium hydroxide, treating the solution with activated charcoal and neutralizing with dilute hydrochloric acid. There are thus obtained 31.5 g. (59% of theory) of 2-furfurylamino-pyrido[2,3-d]pyrimidin-4(3H)-one in the form of pale yellowish crystals which melt, with decomposition, at 262–266° C.

(b) In an analogous manner, by the reaction of 2-chloropyrido[2,3-d]pyrimidin-4(3H)-one with tetrahydrofurfurylamino or with N-methyl-furfurylamine, there are respectively obtained 2-tetrahydrofurfurylamino-pyrido[2,3-d]pyrimidin-4(3H)-one in the form of pale yellowish crystals which, after recrystallization from water, have a melting point of 258–260° C., the yield being 49% of theory, and 2-(N-methylfurfurylamino)-pyrido[2,3-d]pyrimidin-4(3H)-one in the form of colorless crystals which, after recrystallization from water, have a melting point of 172–174° C., the yield being 62.5% of theory.

EXAMPLE 8

2-[2-(furyl-2)-ethylamino]-pyrido[2,3-d]pyrimidin-4(3H)-one 3.6 g. of 2-chloropyrido[2,3-d]pyrimidin-4(3H)-one, 6.6 g. of furyl-(2)-ethylamine and 50 ml. of ethanol are boiled under reflux for 1 hour. After cooling, solid material is filtered off with suction, washed with ethanol and recrystallized from n-butanol. There are thus obtained 2.8 g. (55% of theory) of 2-[2-(furyl-2)-ethylamino]-pyrido[2,3-d]pyrimidin-4(3H)-one in the form of pale yellowish crystals with a melting point of 283–285° C.

EXAMPLE 9

2-thenylamino-pyrido[2,3-d]pyrimidin-4(3H)-one

A mixture of 3.6 g. of 2-chloropyrido[2,3-d]pyrimidin-4(3H)-one, 6.8 g. of thenylamino and 50 ml. of ethanol is heated under reflux for 2 hours. After cooling, solid material is filtered off with suction, washed with ethanol and recrystallized from n-butanol with the use of activated charcoal. There are thus obtained 3.8 g. (73.5% of theory) of 2-thenylamino-pyrido[2,3-d]pyrimidin-4(3H)-one in the form of colorless crystals which have a melting point of 276–278° C.

EXAMPLE 10

2-benzylamino-pyrido[2,3-d]pyrimidin-4(3H)-one 3.6 g. of 2-chloropyrido[2,3-d]pyrimidin-4(3H)-one are heated under reflux for 5 hours with 6.4 g. of benzylamine in 50 ml. of ethanol. Solid material is then filtered off with suction, washed with ethanol, the residue dissolved in 2 N sodium hydroxide solution, treated with activated charcoal and neutralized with 2 N hydrochloric acid. There are thus obtained 3.8 g. (75.5% of theory) of 2-benzylamino-pyrido[2,3-d]pyrimidin-4(3H)-one in the form of colorless crystals which have a melting point of 288–290° C.

EXAMPLE 11

2-dimethylamino-pyrido[2,3-d]pyrimidin-4(3H)-one (a) 5.45 g. of 2-chloropyrido[2,3-d]pyrimidin-4(3H)-one, 27 g. of dimethylamine and 100 ml. of methanol are heated to 110° C. for 5 hours in an autoclave. The reaction mixture is then evaporated to dryness in a vacuum, whereafter the residue is taken up in water, extracted with chloroform at pH 7, the chloroform extract evaporated and the residue obtained then recrystallized from benzene with the use of activated charcoal. There is thus obtained 1.9 g. (33% of theory) of 2-dimethylamino-pyrido[2,3-d]pyrimidin-4(3H)-one in the form of pale yellowish crystals with a melting point of 194–196° C.

(b) In an analogous manner, by the reaction of 2-chloropyrido[2,3-d]pyrimidin-4(3H)-one with diethylamine, there is obtained, in a yield of 49% of theory, 2-diethylamino-pyrido[2,3-d]pyrimidin-4(3H)-one in the form of colorless crystals which have a melting point of 152–153° C.

EXAMPLE 12

2-[ethyl-(2-hydroxyethyl)-amino]-pyrido[2,3-d]pyrimidin-4(3H)-one (a) 3.6 g. of 2-chloropyrido[2,3-d]pyrimidin-4(3H)-one, 5.3 g. of 2-ethylaminoethanol and 50 ml. of ethanol are boiled under reflux for 5 hours. The reaction mixture is then evaporated to dryness in a vacuum, the evaporation residue is taken up in water, neutralized and then extracted with chloroform. By recrystallization of the evaporation residue of the chloroform extract from water with the use of activated charcoal, there are obtained 2.1 g. (45% of theory) of 2-[ethyl-(2-hydroxyethyl)-amino]pyrido[2,3-d]pyrimidin-4(3H)-one in the form of colorless crystals which have a melting point of 197–198° C.

(b) In an analogous manner, by the reaction of 2-chloropyrido[2,3-d]pyrimidin-4(3H)-one with diethanolamine, there is obtained, in a yield of 48% of theory, 2-[bis-(2 - hydroxyethyl)-amino]pyrido[2,3-d]pyrimidin-4(3H)-one, which has a melting point of 197–198° C.

EXAMPLE 13

2-(2-methylmercaptoethylamino)-pyrido[2,3-d]pyrimidin-4(3H)-one 3.6 g. of 2-chloropyrido[2,3-d]pyrimidin-4(3H)-one are heated under reflux for 5 hours with 5.5 g. of 2-methylmercaptoethylamine in 35 ml. of ethanol. After cooling, solid material is filtered off with suction, the residue is dissolved in 2 N aqueous sodium hydroxide solution, treated with activated charcoal and 2 N hydrochloric acid added until the pH is 5. There are thus obtained 3.3 g. (70% of theory) of 2-(2-methylmercaptoethylamino)-pyrido[2,3-d]pyrimidin-4(3H)-one in the form of colorless crystals which have a melting point of 282–284° C.

The activity of the novel compounds was demonstrated as follows:

Female Sprague Dawley rats having an average weight of 180 grams were maintained in a fasting condition overnight but were allowed an unlimited amount of drinking water. These rats were maintained for at least one week prior to the experiments in climatized rooms held at 23°±1° C. and at a relative humidity of 60±5%. During the experiments the animals were placed into metabolic cages, 5 rats per cage.

The test compound was administered orally and intraperitoneally in an amount of 25 mg./kg. in a 0.5% methyl cellulose solution (10 ml./kg.). Before starting the experiments and after 2 hours had elapsed, and again after six hours had elapsed, the animals' bladders were pressed out and the volume of urine measured and the chloride content of the urine determined titrametrically and Na+ and K+ flame photometrically. As a comparison, there were also tested 2-amino-pyrido[2,3-d]pyrimidin-4(3H)-one (Compound A) and 2-phenylamino-pyrido[2,3-d]pyrimidin-4(3H)-one (Compound B) disclosed in British Pat. No. 774,095.

The results are set forth in the following table:

TABLE

| Test compound | Excretion/kg. during— | | | | | | | | | |
|---|---|---|---|---|---|---|---|---|---|---|
| | 2 hours | | | | | 6 hours | | | | |
| | Ml. urine | Cl | mVal Na | K | Na/K | Ml. urine | Cl | mVal Na | K | Na/K |
| Control | 9 | 0.05 | 0.10 | 0.22 | 0.5 | 13 | 0.39 | 0.43 | 0.62 | 0. |
| Compound A | 10 | 0.30 | 0.16 | 0.23 | 0.7 | 24 | 1.2 | 0.88 | 0.81 | 1.1 |
| Compound B | 10 | 0.35 | 0.17 | 0.25 | 0.7 | 18 | 1.0 | 0.76 | 0.66 | 1.1 |
| Example: | | | | | | | | | | |
| 1a | 19 | 1.6 | 1.1 | 0.22 | 4.9 | 41 | 4.1 | 3.7 | 0.78 | 4.7 |
| 1b | 9 | 0.38 | 0.24 | 0.16 | 1.5 | 25 | 1.6 | 1.1 | 0.68 | 1.7 |
| 2a | 7 | 0.39 | 0.26 | 0.12 | 2.1 | 20 | 1.7 | 1.3 | 0.49 | 2.7 |
| 2b | 15 | 0.66 | 0.43 | 0.31 | 1.4 | 35 | 2.9 | 2.3 | 1.3 | 1.8 |
| 3a | 14 | 1.2 | 0.90 | 0.23 | 3.9 | 35 | 3.8 | 3.1 | 0.85 | 3.7 |
| 3b | 14 | 0.76 | 0.56 | 0.25 | 2.2 | 28 | 1.8 | 1.5 | 1.1 | 1.4 |
| 6 | 16 | 0.63 | 0.62 | 0.33 | 1.9 | 37 | 2.8 | 2.7 | 1.2 | 2.2 |
| 7 | 13 | 1.4 | 1.2 | 0.17 | 7.2 | 31 | 3.4 | 3.2 | 0.56 | 5.7 |
| 9 | 13 | 0.40 | 0.42 | 0.23 | 1.9 | 30 | 2.3 | 2.2 | 1.0 | 2.1 |
| 10 | 11 | 0.41 | 0.31 | 0.15 | 2.1 | 26 | 1.9 | 1.6 | 0.57 | 2.8 |
| 11b | 17 | 1.3 | 1.1 | 0.29 | 3.7 | 29 | 2.6 | 2.2 | 0.74 | 3.0 |

From the foregoing table it can be seen that the potassium content of the urine is not substantially changed by administration of the novel compounds either in 2 hours or in 6 hours. On the other hand, the sodium content is clearly increased several-fold. Thus the sodium/potassium ratios are much higher using the novel compounds, permitting them to be used where a selective effect on the sodium content is desired. Moreover, the compounds have a pronounced diuretic effect as can be seen from the marked increase in urine excretion, some of the compounds producing this effect to a considerable degree even in only two hours.

It will be appreciated that the instant specification and examples are set forth by way of illustration and not limitation, and that various modifications and changes may be made without departing from the spiirt and scope of the present invention.

What is claimed is:

1. A pyrido[2,3-d]pyrimidin-4(3H)-one of the formula

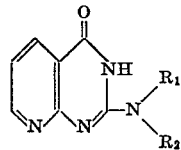

(I)

wherein $R_1$ is lower alkyl having 1–3 carbon atoms; lower alkyl having 1–3 carbon atoms and substituted by hydroxy, 1 or 2 alkoxy groups having 1–2 carbon atoms, methylmercapto, phenyl-, furyl-, tetrahydrofuryl- or thienyl allyl; or cyclopentyl; and $R_2$ is hydrogen or any of the groups of $R_1$, and the salts thereof with physiologically compatible acids.

2. Compound according to claim 1 wherein such compound is 2-diethylamino-pyrido[2,3-d]pyrimidine-4(3H)-one or a salt thereof.

3. Compound according to claim 1 wherein such compound is 2-methylamino-pyrido[2,3-d]pyrimidine-4(3H)-one or a salt thereof.

4. Compound according to claim 1 wherein such compound is 2-furfurylamino-pyrido[2,3-d]pyrimidine-4(3H)-one or a salt thereof.

5. Compound according to claim 1 wherein such compound is 2-allylamino-pyrido[2,3-d]pyrimidine-4(3H)-one or a salt thereof.

References Cited

UNITED STATES PATENTS 3,021,332  2/1962  Hitchings et al. ____ 260—256.4

FOREIGN PATENTS 774,095  5/1957  England.

DONALD G. DAUS, Primary Examiner

R. V. RUSH, Assistant Examiner

U.S. Cl. X.R.

260—256.4 N, 256.5 R; 424—251

UNITED STATES PATENT OFFICE
CERTIFICATE OF CORRECTION

Patent No. 3,794,637  Dated February 26, 1974

Inventor(s) FRITZ WEIDEMANN ET AL.

It is certified that error appears in the above-identified patent and that said Letters Patent are hereby corrected as shown below:

Col. 5, line 68, change "thenylamino" to -- thenylamine --.

Col. 7, in the Table, in the last column of the Table (Col. "Na/K", second occurrence), cancel " 0." and substitute therefor -- 0.7 --.

Signed and sealed this 8th day of October 1974.

(SEAL)
Attest:

McCOY M. GIBSON JR.
Attesting Officer

C. MARSHALL DANN
Commissioner of Patents